United States Patent [19]

Oda et al.

[11] 4,427,523

[45] Jan. 24, 1984

[54] CATHODE FOR ELECTROLYSIS OF ALKALI METAL CHLORIDE

[75] Inventors: Yoshio Oda; Takeshi Morimoto; Kohji Suzuki, all of Yokohama, Japan

[73] Assignee: Asahi Glass Company Ltd., Tokyo, Japan

[21] Appl. No.: 296,858

[22] Filed: Aug. 27, 1981

Related U.S. Application Data

[63] Continuation of Ser. No. 186,847, Sep. 15, 1980, abandoned.

[30] Foreign Application Priority Data

Sep. 21, 1979 [JP] Japan .................. 54-120721

[51] Int. Cl.$^3$ .................. C25B 11/04; H01M 4/62; H01M 4/86
[52] U.S. Cl. .................. 204/290 R; 204/98; 429/42
[58] Field of Search .......... 429/42; 204/290 R, 291, 204/294

[56] References Cited

U.S. PATENT DOCUMENTS

| | | | |
|---|---|---|---|
| 3,668,014 | 6/1972 | Katsoulis et al. | 429/42 |
| 3,778,311 | 12/1973 | Metzger et al. | 429/42 |
| 4,035,254 | 7/1977 | Gritzner | 204/98 |
| 4,214,969 | 7/1980 | Lawrance | 204/255 |
| 4,236,993 | 12/1980 | Muller et al. | 204/294 |
| 4,287,032 | 9/1981 | Pellegri | 204/128 |
| 4,294,893 | 10/1981 | Iemmi et al. | 429/42 |

FOREIGN PATENT DOCUMENTS

| | | | |
|---|---|---|---|
| 1597127 | 7/1930 | France | 429/42 |
| 2090116 | 1/1972 | France | |
| 2180488 | 11/1973 | France | |

OTHER PUBLICATIONS

Iketa et al., Chemical Abstracts vol. 83, No. 24, Abstract 194757j, 12/75.
Ohishi et al., Chemical Abstracts, vol. 91, No. 24, Abstract 91:201221a 12/79.

*Primary Examiner*—F. Edmundson
*Attorney, Agent, or Firm*—Oblon, Fisher, Spivak, McClelland & Maier

[57] ABSTRACT

A porous cathode for electrolysis of an alkali metal chloride comprises a substrate and a coating comprising, a catalyst, a water repellent material and a pore forming agent. The water repellent material is a combination of a first fluorinated resin having a particle diameter of 0.1 to 20μ and a melting point of 300° to 340° C. and a second fluorinated resin having a particle diameter of 1 to 50μ and a melting point of 160° to 320° C. and said first resin has higher melting point than that of said second resin.

7 Claims, 1 Drawing Figure

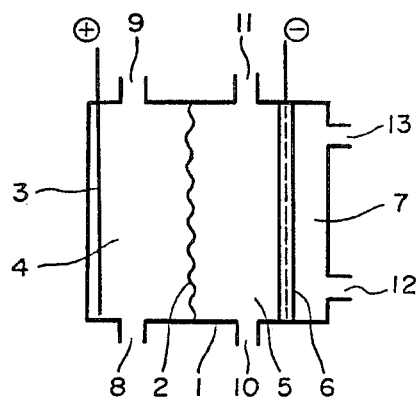

CATHODE FOR ELECTROLYSIS OF ALKALI METAL CHLORIDE

This is a continuation, of applicatiion Ser. No. 186,847, filed Sept. 15, 1980, now abandoned.

BACKGROUND OF THE INVENTION

1. Field of the Invention

The present invention relates to a cathode for electrolysis of an alkali metal chloride. More particularly, it relates to a cathode which requires a lower cell voltage in a process for producing an alkali metal hydroxide by an electrolysis of an aqueous solution of an alkali metal chloride by using a cation exchange membrane.

2. Description of the Prior Art

As a process for producing an alkali metal hydroxide by an electrolysis of an aqueous solution of an alkali metal chloride, a diaphragm method has been mainly employed instead of a mercury metod in view of a prevention of a public pollution.

It has been proposed to use an ion exchange membrane in place of asbestos as a diaphragm to produce an alkali metal hydroxide by electrolyzing an aqueous solution of an alkali metal chloride so as to obtain an alkali metal hydroxide having high purity and high concentration.

On the other hand, it has been proposed to save energy in the world. From the viewpoint, it has been required to minimize a cell voltage in such technology.

Certain processes have been proposed as processes for lowering a cell voltage. Among these processes, as a relatively advantageous process, it has been proposed to reduce a cell voltage by using a porous gas permeable cathode by dividing a cathode compartment into two parts; filling a catholyte in the part partitioned by the cathode and a membrane; feeding an oxygen-containing gas such as air in a space between the cathode and a wall of the cell so as to diffuse the gas in the gas permeable cathode whereby hydroxyl group is rapidly formed by reacting water with oxygen.

Such cathode is prepared by incorporating silver or a platinum group metal as a catalyst so as to accelerate the formation of hydroxyl group and incorporating a water repellent material such as polytetrafluoroethylene and paraffin so as to prevent a leakage of the resulting alkali metal hydroxide or water.

In the conventional process a desired porous cathode has been prepared by mixing the catalytic component with an aqueous dispersion of polytetrafluoroethylene, etc. as the resin having such water repellency.

Polytetrafluoroethylene is used for said purpose imparting water repellency as well as maintaining configuration as the cathode by combining with the catalytic component. The resulting cathode, however, is gradually broken down to reduce the water repellency and the function as the cathode is deteriorated.

The inventors have studied the reason why such phenomenon is caused, and have found that it relates to the particle size and the melting point of polytetrafluoroethylene.

The polytetrafluoroethylene used in the conventional process is in a form of rough particles having an average diameter of 500$\mu$ and has a melting point of about 327° C. When only such polytetrafluoroethylene resin is used, it has been difficult to prevent the deterioration of the function of the cathode even though the process for preparing the cathode is improved.

SUMMARY OF THE INVENTION

It is an object of the present invention to provide a porous gas permeable cathode which imparts stable water repellency for a long period.

The object of the present invention has been attained by using two kinds of fluorinated resins having different particle sizes and different melting points.

The object of the present invention has been attained by providing a porous cathode for an electrolysis of an alkali metal chloride by using a substrate, a catalyst, a water repellent component and a pore-forming agent, wherein a fluorinated resin having a particle diameter of 0.1 to 20$\mu$ and a melting point of 300° to 340° C. (first resin) and a fluorinated resin having a particle diameter of 1 to 50$\mu$ and a melting point of 160° to 320° C. (second resin) which has larger particle diameter and lower melting point than those of the first resin are used as the water repellent component.

BRIEF DESCRIPTION OF THE DRAWING

FIG. 1 shows one embodiment of an electrolytic cell equipped with a cathode of the present invention.

DETAILED DESCRIPTION OF THE PREFERRED EMBODIMENTS

The first resin is used for firmly bonding the catalyst particles and is preferably a resin having a smaller diameter and higher melting point. When the resin particles are mixed with the catalyst particles, the particles having higher melting point tend to oriented in a fibrous state thereby firmly bonding the catalyst particles.

The second resin is used for imparting desired water repellency to the cathode and improving fabricability and is preferably a resin having relatively low melting point and larger particle diameter. The second resin has relatively larger diameter to satisfactorily fill spaces between the catalyst particles thereby improving the water repellency. The second resin has lower melting point than the first resin whereby it has low friction coefficient and superior lubricating property and is easily dispersible in a powder or a liquid medium. It remarkably improves fabricability in a roll-molding or an extrusion molding of a composition of the resins and the catalyst particles.

The melting point of the resin should be considered depending upon the desired characteristics of the resin for example, characteristics as a binder or characteristics for fabricability or water repellency.

The first resin should have a melting point of 300° to 340° C. preferably 310° to 335° C. in view of the resin for the fibrous form. The second resin should have a melting point of 160° to 320° C. preferably 170° to 310° C. in view of the resin for spreadability and water repellency. The melting point of the first resin should be higher than the melting point of the second resin. The difference of the melting point is depending upon the level of the melting points of the resins and is usually greater than 5° C. preferably greater than 10° C. especially greater than 20° C.

A ratio of a particle diameter of said second resin to that of said first resin is in a range of 2 to 100 preferably 5 to 30.

The particle diameter of the second resin is substantially greater than the particle diameter of the first resin at a rate of more than two times preferably more than 5 times.

The first resin used in the present invention is preferably polytetrafluoroethylene, or tetrafluoroethylene-perfluoroalkyl perfluorovinyl ether copolymer.

The second resin is preferably polytetrafluoroethylene, tetrafluoroethylene-hexafluoropropene copolymer, polychlorotrifluoroethylene, tetrafluoroethylene-perfluoroalkyl perfluorovinyl ether copolymer or ethylene-tetrafluoroethylene copolymer. One or more kinds of the resins can be used for the first resin or the second resin.

It is especially preferable to use polytetrafluoroethylene as the first resin and polytetrafluoroethylene or tetrafluoroethylene-hexafluoropropylene copolymer as the second resin in view of excellent water repellency for a long time. It is preferable to combine the first resin and the second resin at a ratio of 10 to 98 wt.% of the first resin to 2 to 90 wt.% of the second resin preferably at a ratio of 20 to 95 wt.% of the first resin to 5 to 80 wt.% of the second resin, especially at a ratio of 20 to 70 wt.% of the first resin to 30 to 80 wt.% of the second resin.

It is not preferable to be out of said range since a desired result may not be obtained.

The total amount of the first and second resins is depending upon the kind and properties of the materials for the substrate and is usually at a ratio of about 2 to 80 wt.% based on the total components for the cathode.

When the ratio of the resins is less than said range, a liquid leakage or a peeling of the catalyst from the substrate is caused, whereas when it is more than said range, the electric resistance is higher to cause inferior characteristics, because of the covering of the surface of the catalyst with the water repellent resin. It is the optimum to incorporate the resins at a ratio 5 to 60 wt.%, since there is not any trouble of the liquid leakage or the peeling of the catalyst and the catalytic activity is not substantially lost.

The substrate used in the present invention is to maintain the form of the cathode. The material for the substrate is usually carbon. It is also possible to use a porous plate made of a metal such as nickel, iron and stainless steel or non-porous metal strands, bundled or plied regularly or irregularly. In the case of the carbon substrate, a porous molded substrate such as the porous metal substrate can be used. It is optimum to prepare a porous cathode comprising the desired components which is obtained by heating a molded mixture of carbon powder, a pore forming agent and desired additives.

The catalyst used in the present invention is to improve the reaction velocity of the electrode reaction for forming hydroxyl group by reacting oxygen with water. The catalyst can be platinum group metals such as Pt and Pd; silver; alloys such as Raney silver; spinel compounds such as $Co.Fe.Al_2O_3$ perovskite ionic crystals such as $La.NiO_3$; metal phthalocyanines such as cobalt phthalocyanine and a mixture thereof. The amount of the catalyst is depending upon the kind of the catalyst and is usually in a range of about 0.01 to 200 mg./cm$^2$. When the amount of the catalyst is less than the range, the reaction velocity for forming hydroxyl group is not satisfactorily high enough in an industrial process. When the amount of the catalyst is more than the range, any greater effect is not expected but a cost of the cathode is disadvantageously higher. It is especially preferable to be in a range of 0.1 to 100 mg./cm.$^2$, because a electrochemically satisfactory activity is imparted. It is optimum to use platinum, palladium or silver as the catalyst because the catalytic activity for forming hydroxylation ion is remarkably high.

The pore forming agent used in the process can be nickel salts of carboxylic acids such as nickel formate, nickel citrate, nickel stearate and nickel oxalate; cobalt salts of carboxylic acids such as cobalt formate, cobalt citrate, cobalt stearate, and cobalt oxalate; silver salts of carboxylic acids such as silver citrate, silver acetate, silver oxalate, silver benzoate and silver lactate and a mixture thereof.

It is optimum to use nickel formate, cobalt formate or silver citrate as the pore forming agent, since it impart the optimum pore forming function.

The amount of the pore forming agent is depending upon the kind of the substance in which pores are formed and the kind of the pore forming agent and is usually in a range of about 5 to 60 wt.%. When the amount of the pore forming agent is less than the range, a desired pore forming effect can not be expected whereas when it is more than the range, many ununiform pores are formed to cause remarkably inferior cathode performance.

It is optimum to use the pore forming agent at the ratio of 10 to 50 wt.% because the optimum cathode can be obtained.

In the porous cathode of the present invention, when the pore diameter is too small, oxygen gas can not be satisfactorily diffused to result in inferior function, whereas when it is too large, the electrolyte is leaked to result in less area of the three phases of the electrolyte, the catalyst and oxygen which are contacted with each other. The average pore diameter of the cathode is usually preferably to be in a range of about 0.01 to 30$\mu$.

The porosity highly affects to the characteristics for electrolysis. When the porosity is too small, the oxygen-containing gas can not be satisfactorily diffused whereas when the porosity is too large, the electrolyte is leaked or the strength is too low. The porosity of the cathode is preferably in a range of about 20 to 80%.

The air permeable coefficient of the cathode is also important factor for the characteristics. When the air permeable coefficient is too small, the oxygen-containing gas can not be satisfactorily diffused whereas when it is too large, the oxygen-containing gas is bubbled into the catholyte and the desired result can not be obtained. Therefore, the air permeable coefficient is usually preferable in a range of $10^{-5}$ to $10^{-1}$ mol./cm$^2$.min.cmHg.

The cathode having the characteristics of an average pore diameter of 0.05 to 20$\mu$, a porosity of 30 to 70% and an air permeable coefficient of $10^{-4}$ to $10^{-1}$ mol./cm$^2$.cmHg is optimum because any liquid leakage is not caused, a satisfactory inner surface area is given and a satisfactory gas diffusion effect can be expected.

In the preparation of the cathode, for example, using carbon as the material for the substrate, an aqueous solution of a water soluble salt of catalyst such as noble metal chloride, nitrates and sulfates is prepared and carbon powder is admixed to support the noble metal salt on the carbon powder and then, the noble metal salt is converted into the noble metal by reducing it with a reducing agent such as hydrazine and sodium boron hydride or by thermal decomposition after the evaporation of water. Then, the water repellent materials such as resins, the pore forming agent, and a medium for the paste such as water and alcohols are admixed with the product and the mixture is kneaded and rolled to mold it in a desired thickness. The resulting sheet is bonded on a current collector such as a nickel net by means of a pressing process and then, it is baked at 200° to 380° C. for 10 to 90 minutes in an inert gas atmosphere to obtain a porous cathode. It is also possible to obtain the porous cathode by mixing the carbon powder, the catalyst source, the pore forming agent and the water repellent materials and baking the mixture under the reducing condition such as in an inert gas atmosphere or a reducing gas atmosphere.

In the process for producing an alkali metal hydroxide by an electrolysis of an aqueous solution of an alkali metal chloride by using the cathode obtained by the present invention, as referring to FIG. 1, an electric cell (1) is partitioned with a cation exchange membrane (2) by the conventional manner into an anode compartment equipped with an anode (3) and a cathode compartment (5). An oxygen-containing gas (air) feeding compartment (7) is formed by the cathode (6) in the cathode compartment (5). It further comprises an inlet (8) for an aqueous solution of an alkali metal chloride such as sodium chloride as an electrolyte; an outlet (9) for the aqueous solution; an inlet (10) for water into the cathode compartment; an outlet (11) for the resulting alkali metal hydroxide; and an inlet (12) and an outlet (13) of the oxygen-containing gas.

The anode used for the present invention can be a metal electrode having dimensional stability such as niobium, titanium or tantalum substrate coated with a metal oxide such as oxides of ruthenium and rhodium iridium; or graphite. The metallic anode is preferably used because the cell voltage can be lower than those of the other anodes.

The cation exchange membrane on which the electrode layer is formed, can be made of a polymer having cation exchange groups such as carboxylic acid groups, sulfonic acid groups, phosphoric acid groups and phenolic hydroxy groups. Suitable polymers include copolymers of a vinyl monomer such as tetrafluoroethylene and chlorotrifluoroethylene and a perfluorovinyl monomer having an ion-exchange group such as sulfonic acid group, carboxylic acid group and phosphoric acid group or a reactive group which can be converted into the ion-exchange group. It is also possible to use a membrane of a polymer of trifluoroethylene in which ion-exchange groups such as sulfonic acid group are introduced or a polymer of styrene-divinyl benzene in which sulfonic acid groups are introduced.

The cation exchange membrane is preferably made of a fluorinated polymer having the following units, since an alkali metal hydroxide having high purity can be obtained at relatively high current efficiency.

(M)  $+CF_2-CXX'+$  (M mole %)

(N)  $+CF_2-CX+$  (N mole %)
            $|$
            $Y$ wherein X represents fluorine, chlorine or hydrogen atom or —CF$_3$; X' represents X or CF$_3$(CF$_2$)$_{\overline{m}}$; m represents an integer of 1 to 5, and Y represents —P—A or —O—(CF$_2$)$_{\overline{n}}$(P,Q,R)A, and P represents +CF$_2$)$_{\overline{a}}$(CXX')$_{\overline{b}}$(CF$_2$)$_{\overline{c}}$; Q represents +CF$_2$—O—CXX')$_{\overline{d}}$; and R represents +(CXX'—OCF$_2$)hd e; (P,Q,R) means to arrange at least each one of P, Q and R in a desired order; X and X' are defined above; n is 0 to 1 and a, b, c, d and e are respectively 0 to 6; A represents —COOM or —SO$_3$M, or a functional group which is convertible into —COOM or —SO$_3$M by a hydrolysis or a neutralization such as —CN, —COF, —COOR$_1$, —SO$_2$F, —CONR$_2$R$_3$ and —SO$_2$NR$_2$R$_3$ and M represents hydrogen or an alkali metal atom; R$_1$ represents a C$_1$-C$_{10}$ alkyl group; R$_2$ and R$_3$ represent H or a C$_1$-C$_{10}$ alkyl group.

The typical examples of Y have the structures bonding A to a fluorocarbon group such as

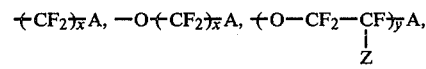

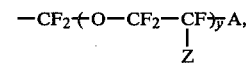

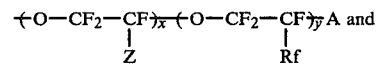

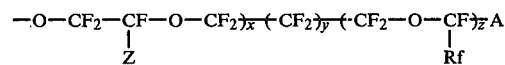

x, y and z respectively represents an integer of 1 to 10; Z and Rf represent —F or a C$_1$-C$_{10}$ perfluoroalkyl group.

It is preferable to use a fluorinated cation exchange membrane having a ion exchange group content of 0.5 to 4.0 meq/g dry resin since the current efficiency can be greater than 90% even though a concentration of sodium hydroxide is higher than 40%. When the ion exchange group content is in a range of 1.0 to 2.0 meq/g. dry resin, sodium hydroxide having such high concentration can be produced at high current efficiency for a long time in stable condition.

It is preferable that the units (N) is 1 to 40 mol % especially 3 to 20 mol % so as to give the above-mentioned ion exchange capacity of the membrane in the case of the copolymer having units (M) and (N). The thickness of the membrane is preferably in a range of 20 to 600μ especially about 50 to 400μ.

The alkali metal chloride used for the electrolysis is usually sodium chloride and can be other alkali metal chlorides such as potassium chloride and lithium chloride.

The present invention will be further illustrated by certain examples and references which are provided for purposes of illustration only and are not intended to limit the present invention.

EXAMPLE 1

A mixture of 55 wt.% of amicron silver having a particle diameter of about 700 Å, 15 wt.% of powdery activated carbon and 15 wt.% of nickel formate powder was thoroughly mixed and an aqueous dispersion containing polytetrafluoroethylene (m.p. 327° C.) having a particle diameter of 0.2 micron at a ratio of 60 wt.% was added at a ratio of 10 wt.% as a solid component, and a powdery polytetrafluoroethylene (m.p. 300° C.) having a particle diameter of 8 microns was added at a ratio of 5 wt.% and the mixture was kneaded. The paste was rolled to obtain a sheet having a desired thickness. The sheet was bonded on a nickel net (40 mesh) by a press-molding machine under a molding pressure of 1000 kg./cm$^2$. The molded product was baked at 350° C. for 60 minutes in nitrogen gas atmosphere to melt-bond polytetrafluoroethylene whereby the water repellency and bonding strength were improved and nickel formate was thermally decomposed to obtain a porous electrode having an average pore diameter of 0.6μ, a porosity of 56%, and an air permeable coefficient of $1.2 \times 10^{-3}$ mol./cm².min.cmHg. The electrode contained silver at a ratio of 50 mg./cm².

The resulting electrode was equipped in the electrolytic cell shown in FIG. 1 wherein a metal anode made of a titanium substrate coated with ruthenium oxide was used and a cation exchange membrane of a fluorinated polymer obtained by hydrolyzing a membrane of a copolymer of $C_2F_4$ and $CF_2=CFO(CF_2)_3COOCH_3$ (thickness = 300μ; $A_R$ = 1.48 meq./g.) was used as the membrane. Air (carbon dioxide gas is removed) was fed into the gas feeding compartment at a rate of 1 liter/min. and an electrolysis of 25% aqueous solution of sodium chloride was carried out under controlling the feed rates of the aqueous solution of sodium chloride and water so as to maintain 30 wt.% of a concentration of sodium hydroxide in the cathode compartment.

In the electrolysis using the cathode of the present invention at a current density of 20 A/dm², a cell voltage was 2.21 V and a cell voltage was increased only for 0.08 V after the operation for 1000 hours.

EXAMPLE 2

In accordance with the process of Example 1 except mixing and kneading a mixture of 70 wt.% of silver carbonate for a catalyst silver, 10 wt.% of powdery activated carbon 15 wt.% of polytetrafluoroethylene (m.p. 327° C.) having a particle diameter of 0.2 micron and 10 wt.% of polytetrafluoroethylene (m.p. 300° C.) having a particle diameter of 8 microns a cathode was prepared. The cathode contained silver at a ratio of 50 mg./cm².

In accordance with the process of Example 1, except using the cathode, an electrolysis was carried out. As a result, a cell voltage at the beginning was 2.23 V and the cell voltage was increased only for 0.09 V after the operation for 1000 hours.

EXAMPLE 3

In accordance with the process of Example 1 except producing powdery activated carbon supporting 10 wt.% of palladium obtained by reducing palladium chloride on powdery activated carbon with formaline and mixing and kneading 85 wt.% of the powdery activated carbon supporting palladium; 10 wt.% of polytetrafluoroethylene (m.p. 327° C.) having a particle diameter of 0.2 micron and 10 wt.% of polytetrafluoroethylene (m.p. 300° C.) having a particle diameter of 8 microns, a cathode was prepared. The cathode contained palladium at a ratio of 2 mg./cm².

In accordance with the process of Example 1 except using the cathode, an electrolysis was carried out. As a result, a cell voltage at the beginning was 2.21 V and the cell voltage was increased only for 0.08 V after the operation for 1000 hours.

EXAMPLE 4

In accordance with the process of Example 1 except using polytetrafluoroethylene-hexafluoropropene copolymer (m.p. 320° C.) having a particle diameter of 17μ was used instead of polytetrafluoroethylene powder (m.p. 300° C.), a cathode was prepared and an electrolysis was carried out. As a result, a cell voltage at the beginning was 2.22 V.

REFERENCE

In accordance with the process of Example 1 except that the polytetrafluoroethylene powder (m.p. 300° C.) was not incorporated, a cathode was prepared. The cathode had an average pore diameter of 3μ, a porosity of 72%, and an air permeable coefficient of $1 \times 10^3$ mol./cm².min.cmHg.

In accordance with the process of Example 1 except using the cathode, an electrolysis was carried out. As a result, a cell voltage at the beginning was 2.20 V and the cell voltage was increased for 0.21 V after the operation for 1000 hours.

We claim:

1. A porous cathode for electrolysis of an alkali metal chloride comprising a substrate, and a coating comprising a catalyst, a water repellent material and a pore forming agent, said water repellent material being an admixture of a first fluorinated resin having a particle diameter of 0.1 to 20μ and a melting point of 300° to 340° C. and a second fluorinated resin having a particle diameter of 1 to 50μ and a melting point of 160° to 320° C., and said first resin having a higher melting point than that of said second resin by greater than 5° C.

2. The cathode according to claim 1 wherein said first resin is polytetrafluoroethylene or tetrafluoroethylene-perfluoroalkylperfluorovinyl ether copolymer.

3. The cathode according to claim 1 wherein said second resin is polytetrafluoroethylene, tetrafluoroethylene-hexafluoropropene copolymer, polychlorotrifluoroethylene, tetrafluoroethylene-perfluoroalkyl perfluorovinyl ether copolymer, or ethylene-tetrafluoroethylene copolymer.

4. The cathode according to claim 1 wherein the ratio of said first resin to said second resin is 10 to 98 wt.%: 90 to 2 wt.%.

5. The cathode according to claim 1 wherein the total amount of said first resin and said second resin is in a range of 2 to 80 wt.% based on the total components for said cathode.

6. The cathode according to claim 1 having an average pore diameter of 0.01 to 30μ, a porosity of 20 to 80% and an air permeable coefficient of $10^{-5}$ to $10^{-1}$ mol./cm² min.cmHg.

7. The cathode according to claim 1 wherein the ratio of particle diameter of said second resin to that of said first resin is in a range of 2 to 100.

* * * * *